United States Patent
Estes

[11] 3,879,044
[45] Apr. 22, 1975

[54] REINFORCED ELASTOMERIC O-RING WITH IMPROVED COMPRESSION SET

[75] Inventor: Gerald Martin Estes, Wilmington, Del.

[73] Assignee: E. I. du Pont de Nemours and Company, Wilmington, Del.

[22] Filed: June 13, 1973

[21] Appl. No.: 369,739

[52] U.S. Cl. ..... 277/227; 277/DIG. 6; 285/DIG. 18
[51] Int. Cl. .............................................. F16j 15/20
[58] Field of Search ........................ 277/227–235, 277/237, DIG. 6; 285/DIG. 18

[56] References Cited
UNITED STATES PATENTS

| | | |
|---|---|---|
| 1,178,741 | 4/1916 | Mastin ............................... 277/227 |
| 2,370,913 | 3/1945 | Procter .............................. 277/227 |
| 2,974,183 | 3/1961 | Kes et al. ........................... 277/227 |
| 3,049,385 | 8/1962 | Smith ................................. 277/227 |
| 3,552,755 | 1/1971 | Leonard ............................. 277/237 |
| 3,580,590 | 5/1971 | Zotter ................................ 277/227 |

Primary Examiner—Richard E. Aegerter
Assistant Examiner—Robert I. Smith

[57] ABSTRACT

A composition comprising a fluoroelastomer o-ring containing fibers which serve as a filler, said fibers having an L/D ratio of at least 15 and being oriented so that at least 25% of the fibers are at an angle of 30° or less from radii through the center and in the plane of the o-ring. Thus the fibers are primarily radially oriented. The o-ring has improved compression set.

7 Claims, 4 Drawing Figures

REINFORCED ELASTOMERIC O-RING WITH IMPROVED COMPRESSION SET

BACKGROUND OF THE INVENTION

The use of elastomers for the production of gasket materials and in particular O-rings is well known; fluoroelastomer polymers have been utilized effectively in this regard because of their outstanding solvent resistance and their resistance to high temperatures (ca. 450°F.). During their intended use such rings are continually subjected to a great deal of pressure and often high temperature because of their frequent use as sealants for liquids and occasionally gases. The O-rings made from fluoroelastomers have in the past demonstrated a relatively high compression set which varies with both elastomer type and the vulcanization system being used. High values are about 50% at 400°F. for 70 hrs. and 25% compression deflection. Lower values for better stocks are less than about 25% under the same conditions. The lower the compression set the more desirable since these gaskets or O-rings are used as sealants and must fill a gap of a given width. Should the O-ring become permanently distorted, leakage may develop. Therefore, a gasket or O-ring is needed which will retain the desirable properties of the fluoroelastomer such as resistance to high temperature, fuels, oils, hydraulic fluids, solvents and continual weathering but at the same time will exhibit improved resistance to compression set over prior art samples.

SUMMARY OF THE INVENTION

According to this invention it has unexpectedly been discovered that gaskets and in particular O-rings which are made from fluorinated hydrocarbons may be improved with respect to their compression set characteristics if a fibrous filler within said gasket or O-ring is radially oriented. By radially oriented it is meant that at least about 25% of the filler will be oriented at an angle of no greater than about 30° from the radii drawn from the axis of, and in the same plane as, the gasket or O-ring. Expressed otherwise, the radius is the perpendicular to the tangent at the periphery of the gasket. The O-ring or gasket has within it, non-woven acicular (or fibrous) filler which can be characterized by its length to diameter ratio. In the manufacture of such O-rings the fibers are oriented in a particular direction by milling. Then, a strip is cut perpendicular to the direction of fiber orientation, the ends of which are joined to form a circular preform in such a manner that the fibers are radially oriented. The preform is vulcanized by standard procedures. It is essential to the invention that these fibers have an L/D ratio of at least 15.

The preferred fluoroelastomer which is utilized is a fluorinated hydrocarbon polymer; more specifically, it may be described as a copolymer of vinylidene fluoride and of at least one fluorinated ethylenically unsaturated comononer.

DETAILED DESCRIPTION OF THE DRAWINGS AND INVENTION

Figure 1:
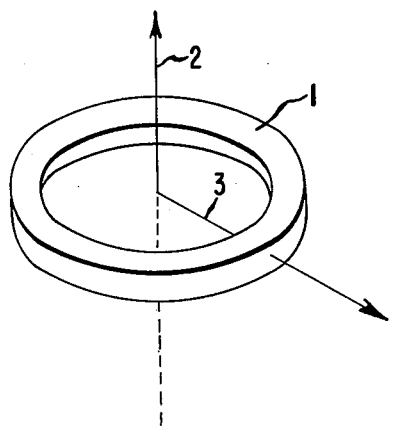
FIG. 1 is a schematic view of an O-ring and the coordinate system.

The numeral 1 in FIG. 1 depicts an O-ring; the axis running through the O-ring is designated as 2. A single radius designated as 3 emanates from the axis 2; this is, of course, done for convenience and one may draw an infinite number of radii emanating from the axis. At any point in the O-ring, at least 25% of the fibrous filler of the O-ring (not shown), preferably 30% and most preferably 40%, are at an angle of not more than about 30° from the radius 3 drawn from the axis 2.

Any of the known fluoroelastomer polymers, which are generally referred to as fluorinated hydrocarbons may be utilized for the construction of the O-ring. Especially preferred, however, is a copolymer of vinylidene fluoride and hexafluoropropylene. Another preferred copolymer is a polymer of vinylidene fluoride, hexafluoropropylene and tetrafluoroethylene. A detailed description of these polymers of vinylidene fluoride and hexafluoropropylene may be found in the following U.S. Pat. Nos: 3,051,677 2,968,649 3,136,745 3,235,537 the disclosures of which are herein incorporated by reference.

The fibers are oriented in the elastomer by standard milling techniques. The composition contains generally 5 through 50 parts of fiber per hundred parts of rubber, preferably 10 through 30 parts of fiber per hundred parts of rubber. It is found that generally above 50 parts the compositions are too stiff and below 5 there is not much of the desired effect.

The milling may take place by any standard milling technique; there is nothing unique about this phase of the process. The fluoroelastomer is generally milled on a mill at room temperature with no cooling. As a rule, the stock heats up during milling to about 80°C. Curing ingredients are added at this time. Equipment such as an internal mixer is sometimes used to incorporate the fibrous filler and curing agents. If internal mixers are used after the mixing the fibers are oriented by milling on a rubber mill. A discussion of the milling and mixing of elastomers, including the use of internal mixers, is to be found in the book INTRODUCTION TO RUBBER TECHNOLOGY by Morton, published by the Reinhold Press, at pages 519–527, which pages are herein incorporated by reference.

It is well-known in the art that acicular fillers orient in the direction of applied stress such as the stress provided by milling or extrusion. Thus, one skilled in the art may readily orient the fillers so that at least about 25% of the fibers form an angle of no more than 30° from the mill or extrusion direction. The fluoroelastomers are milled at room temperature and the fibers orient generally in about 5 minutes. The angle of the fibers may be determined by an X-ray pole figure technique in which the reflection of the X-rays are measured.*

* Such a technique is described in "Elements of X-Ray Difraction," B. O. Cullity, Addison-Wesley, Reading, Mass. 1956, Chapter 9, pp. 272–295.

The fibers may be of any material known for such a purpose. General requirements are that they have a large L to D ratio, at least 15 and preferably at least 20, and that they do not break to L to D ratios less than 10 during the milling which is necessary to orient them in the elastomer.

Fibers found to be useful include:

1. fibrous potassium titanate which has an L to D ratio of about 40; and
2. acicular rutile, a particular crystal modification of titanium dioxide which has an L to D ratio of about 30.

Figure 2A:
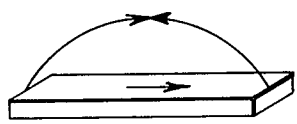
FIGS. 2-4 are a depiction of the procedure for preparing the O-ring preforms and illustrate O-rings which have various filler orientations.
Figure 2B:
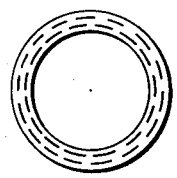
Figure 3A:
Figure 3B:
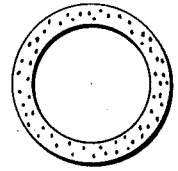
Figure 4A:
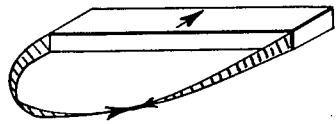

FIGS. 2a, 3a, and 4a illustrate how strips of the fluoroelastomer, and especially the copolymer of vinylidene fluoride and at least one fluorinated ethylenically unsaturated comonomer are formed into O-rings so that the various orientations of the filler in the O-ring may be achieved. The short arrow in the strip preform indicates the direction of the fiber orientation during milling. The long arrows indicate the ways the ends of the strip preforms are joined to produce the O-ring of FIG. 2b having the fibrous filler oriented in a circumferential manner, and FIG. 3b in which the filler is oriented parallel to the axis of the O-ring.

Figure 4B:
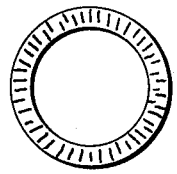

Both types are shown for comparison with the O-ring of FIG. 4b, the preferred configuration which has the filler oriented radially in the O-ring.

The O-ring which is formed according to the procedure of FIG. 4a has the filler oriented radially in such a manner that at least about 25% of said fibers form an angle of no more than 30° from radii drawn to the axis of the O-ring, unexpectedly shows a compression set improvement at 25% deflection of about 10 to 50% relative to fluoroelastomer O-rings formed according to the procedure of FIG. 2a and FIG. 3a.

FIGS. 2b, 3b and 4b illustrate a top view of the respective O-rings including the orientation of the filler included therein.

Figure 2C:
Figure 3C:
Figure 4C:
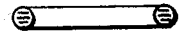

FIGS. 2c, 3c and 4c illustrate a cross-sectional view of the respective O-rings, including the orientation of the filler included therein.

The resulting O-rings may be used as hydraulic seals where fluid resistance and thermal stability are both required.

In the following examples, unless otherwise indicated, all parts and percentages are by weight.

EXAMPLE 1

This example demonstrates that compression set is improved by appropriate filler orientation and that this phenomenon is independent of filler loading level.

An elastomer-curative masterbatch (MB–1) having the following composition (parts by weight) was prepared on a cold two-roll mill: 60 wt. % vinylidene fluoride/40 hexafluoropropylene polymer of Mooney viscosity (ML 10/250°F) 65–100 parts; benzyltriphenylphosphonium chloride - 0.5; bisphenol AF – 2; magnesium oxide – 3.08; and calcium hydroxide – 6.16. Fibrous potassium titanate ($K_2O \cdot 4TiO_2$) of L/D ratio 40 was added to the masterbatch at one of three loading levels (10, 20 or 30 parts per hundred of the masterbatch, phmb). The resulting composite mixture was allowed to band on the mill for more than 5 minutes and then removed from the mill as a slab with a thickness of about 150 mils. Using this anisotropic slab, O-rings were prepared with the three patterns of filler orientation shown in FIGS. 2–4.

The first step in making the O-rings was to cut strip preforms (150 mils wide and 3.5 inches long) from the slab either parallel with or transverse to the mill direction. To make an O-ring as illustrated in FIGS. 2a–2c with filler oriented along the circumference of the O-ring, the strips were cut with the mill direction, while for an O-ring as illustrated in FIGS. 3a–3c with filler oriented parallel to the main axis of the O-ring and for an O-ring as illustrated in FIGS. 4a–4c with filler oriented radially from the major axis of the O-ring, the strips were cut perpendicular to the mill direction. The small arrows on the strip preforms in FIGS. 2a, 3a and 4a indicate the mill direction, and hence the direction of filler orientation. The long arrows show the way these strip preforms were joined to make circular preforms suitable for compression molding into O-rings. Acetone was used to tackify the ends of the strips so that the circular preforms would not come apart. The circular preforms were compression molded in O-ring molds for 10 minutes at 350°F. and then post cured for 24 hours at 450°F. The compression set of the O-rings was determined in quadruplicate according to ASTM D–395 (Method B) after 70 hours at 204°C. The results are shown below for the three filler loadings.

The O-rings of FIGS. 4a–4c exhibit a substantial improvement of compression set relative to either FIGS. 2a–2c or 3a–3c. The degree of relative improvement varies from 14 to 41%.

| Fibrous Potassium Titanate Loading (phmb) | Filler Orientation* | Compression Set FIGS. 4a–4c o-ring | Compression Set Improvement Relative to o-rings of FIGS. | |
|---|---|---|---|---|
| | | | 2a–2c | 3a–3c |
| 10 | — | 13.0% | 18% | 14 |
| 20 | — | 13.3 | 35 | 23 |
| 30 | 32% | 17.1 | 17 | 16 |
| 30 | 32% | 14.2 | 41 | 40 |

* % of fibers within 30° of radii 3 of FIG. 1 determined by a procedure similar to the Cullity reference cited above.

EXAMPLE 2

This example demonstrates that another filler also may be used to give reduced compression set through preferential orientation.

The procedure described in Example 1 was used with the same masterbatch (MB–1). Acicular rutile, L/D ratio 30, was incorporated at the 30 phmb level instead of fibrous potassium titanate. The compression set results shown below indicate that FIGS. 4a–4c O-rings exhibit a relative improvement of 21–24% for acicular rutile with respect to FIGS. 2a–2c and FIGS. 3a–3c O-rings. The orientation of the filler was not measured for this example but is believed to be equivalent to that observed in Example 1.

| Filler Type | Compression Set of FIGS. 4a–4c o-rings | Compression Set Improvement Relative to o-rings of FIGS. | |
|---|---|---|---|
| | | 2a–2c | 3a–3c |
| Acicular Rutile | 16.0% | 24% | 21 |

EXAMPLE 3

This example demonstrates that the compression set of other types of fluoroelastomers can be improved by preferential filler orientation.

The procedures described in Example 1 were followed exactly except that two different masterbatches (MB–2 and MB–3) were used. The composition of MB–2 was (in parts by weight): 60 wt. % vinylidene fluoride/40 hexafluoropropylene polymer of Mooney viscosity 160 – 100 parts; benzyltriphenylphosphonium chloride – 0.4; bisphenol AF – 1.35; magnesium oxide – 4. The composition of MB–3 was identical to that of MB–2 except that it contained 100 parts 25 wt. % tetrafluoroethylene/30 hexafluoropropylene/45 vinylidene fluoride polymer of Mooney viscosity 74 in place of the fluoropolymer in MB–2. MB–2 and MB–3 were each combined with 30 phmb of potassium titanate as in Example 1. The O-rings made from these compositions exhibited the compression set behavior shown below. In both cases, the FIGS. 4a–4c O-rings show about a 15% compression set improvement over the FIGS. 2a–2c and FIGS. 3a–3c O-rings.

| Masterbatch | Filler Orientation * | Compression Set FIGS. 4a–4c o-rings | Compression Set Improvement Relative To o-ring of FIGS. | |
|---|---|---|---|---|
| | | | 2a - 2c | 3a - 3c |
| MB–2 | 54% | 52.2% | 16% | 14 |
| MB–3 | 54% | 52.6% | 14 | 15 |

* % of fibers within 30° of radii 3 of FIG. 1 determined by a procedure similar to the Cullity reference cited above.

What is claimed is:

1. An article of manufacture comprising a fluoroelastomer sealant containing therein non-woven radially oriented fibers, at least about 25% of said fibers forming an angle of no more than about 30° from radii drawn through the center and in the plane of said sealant said fibers having an L/D ratio of at least about 15.

2. The article of manufacture of claim 1 wherein said article is an sealant comprising a copolymer of vinylidene fluoride and at least one fluorinated ethylenically unsaturated comonomer.

3. The article of manufacture of claim 1 wherein at least about 40% of the fibers form an angle of no more than about 30° with radii drawn through the center and in the plane of the sealant.

4. The article of manufacture of claim 1 in which the copolymer is a polymer of vinylidene fluoride and hexafluoropropylene.

5. The article of manufacture of claim 1 in which the fibers are present in the amount of 5–50 parts per hundred parts of rubber.

6. The article of manufacture of claim 1 in which the fiber is selected from the group consisting of fibrous potassium titanate and acicular rutile.

7. The article of manufacture of claim 1 in which the copolymer is a polymer of vinylidene fluoride, hexafluoropropylene and tetrafluoroethylene.

* * * * *